METHOD OF MAKING MODULAR ELECTRONIC ASSEMBLIES

Filed Dec. 4, 1952 3 Sheets-Sheet 1

INVENTOR.
Robert L. Henry, Jr.
BY
[signature]
Walter S. Paul
attorneys

INVENTOR.
Robert L. Henry, Jr.
BY [signature]
Walter S. Paul
Attorneys

METHOD OF MAKING MODULAR ELECTRONIC ASSEMBLIES

Filed Dec. 4, 1952 3 Sheets-Sheet 3

INVENTOR
ROBERT L. HENRY, JR.

BY R. I. Tompkins
ATTORNEYS 2,771,663
Patented Nov. 27, 1956

1

2,771,663

METHOD OF MAKING MODULAR ELECTRONIC ASSEMBLIES

Robert L. Henry, Jr., Silver Spring, Md., assignor to the United States of America as represented by the Secretary of the Navy Application December 4, 1952, Serial No. 324,160

17 Claims. (Cl. 29—155.5)

(Granted under Title 35, U. S. Code (1952), sec. 266)

The invention described herein may be manufactured and used by or for the Government of the United States of America for governmental purposes without the payment of any royalties thereon or therefor.

This invention relates to the mass production of electronic devices and modular portions thereof, regardless of the electronic simplicity or complexity of the end product, electronic devices.

The present concept of mass producing electronic devices, for example radios or television sets, consists of moving the chassis thereof along an assembly line while the components are hand installed. The speed of production is obviously dependent upon the ability of each individual in the line to do his work quickly and accurately. Present methods of production, as the one mentioned briefly above, may be satisfactory in that they are the best known to industry, however, it is an object of this invention to teach a method of mass producing electronic modules and/or complete electronic devices by starting with raw materials and by successive steps of machines, produce the modules and/or devices at a very high rate, and a cost lower than that of present assembly methods.

Another object of the invention is to teach a method of producing an electronic module having a circuit pattern predetermined as to character so as to interfit with other modules or components for forming the end product, the method including the steps of making a number of wafers, preferably ceramic, fixing the desired components thereon, that is, resistors, capacitors, inductors and the like, arranging the wafers in stacked but spaced relation, and holding them fixed in the stacked arrangement as a unit, the steps being carried out by one machine operation after another, the speeds of which are adjustable.

A more specific object of the invention is to provide a method or process of manufacturing electronic units which are complete or modular, comprising the steps of either making or starting with a number of identical wafers having edge notches, applying a conductive coating to the walls of the notches to serve as a part of a circuit, applying a conductive coating to the upper and lower (when desired) surfaces of the wafers, then tinning all of the coatings, fixing the various selected components, as resistors or capacitors, to the wafer surfaces with the conductors connected to the tinned coatings on the surfaces of the wafers, and then fixing risers in aligned notches of a stack of wafers thus simultaneously effecting mechanical support for the wafers and connecting the risers in circuit with the components on the wafers through the coated notches and coatings on the wafer surfaces.

Added to the foregoing, the invention provides a method which may be enlarged to include steps that incorporate various operations including the production of tube sockets, assembling each socket on a wafer and fixing the socket bearing wafer as the uppermost in the stacked assembly of wafers so that one complete unit may be made to consist of a tube and its associated circuit including resistors, capacitors and other components.

2

Ancillary objects and features will become apparent in following the description, the drawings serving as an aid in understanding the method.

In the drawings:

Figs. 1 and 1*a* together are a schematic flow diagram of the steps taken to manufacture a module and assemble it on a base.

GENERAL CONSIDERATION

There are several related pending applications which may be referred to in order to obtain a more clear understanding of the electrical modular unit produced by practicing the method described herein (see application Serial No. 318,148, filed on October 31, 1952, Robert L. Henry, inventor) and some of the apparatus used in the mechanical manufacture of the module and its base. Even though the use of various machinery and electronic equipment is resorted to for the purpose of speeding production and maintaining cost low, the entire process could be practiced by hand or with the aid of the most rudimentary of hand tools.

The broad objective of the described method is the mechanized production of electronic equipment that measures up to or surpasses present day acceptable standards as to quality and yet, which can be produced immensely faster to meet an emergency military demand and at a cost considerably smaller than equipment produced by known methods of production. The instant method of manufacture accomplishes the objective.

Electronic apparatus used by the military alone, is very diversified. For example there are large numbers of radio and radar receivers that differ in function and construction, without specifically mentioning other types of equipment. Hence, there must be enough flexibility inherent in the process to make it easily adaptable for the production of sundry types of equipment. With this in view, a modular design (see application Serial No. 318,148) is adopted with the ceramic wafer W the basic unit. In this way a stack of such wafers can be arranged to accommodate a single tube together with its circuit. Thus, an apparatus, as a sonabuoy, may be made of a number of tubes, each mounted at the top of its module with the remainder of the module to accommodate the tube external circuit. When the proper modules are assembled on a base which has a circuit pattern connecting the module circuits, the electronic portion of the sonabuoy is completed. Although it is not intended to repair a sonabuoy because it is an expendable apparatus, the facility of repair by removal and replacement of an entire module that has a defective part, is obvious. In other electronic equipment, as a radar receiver or transmitter, the benefit derived from the ease of repair, is manifest.

*Part 1*

The wafer W is a significant part of the complete modular unit, and the steps of making it together with the steps dealing with initial preparation of wafer W are discussed initially. Procedure that is followed for all wafers regardless of their ultimate use, is considered under part one.

Figure 1:
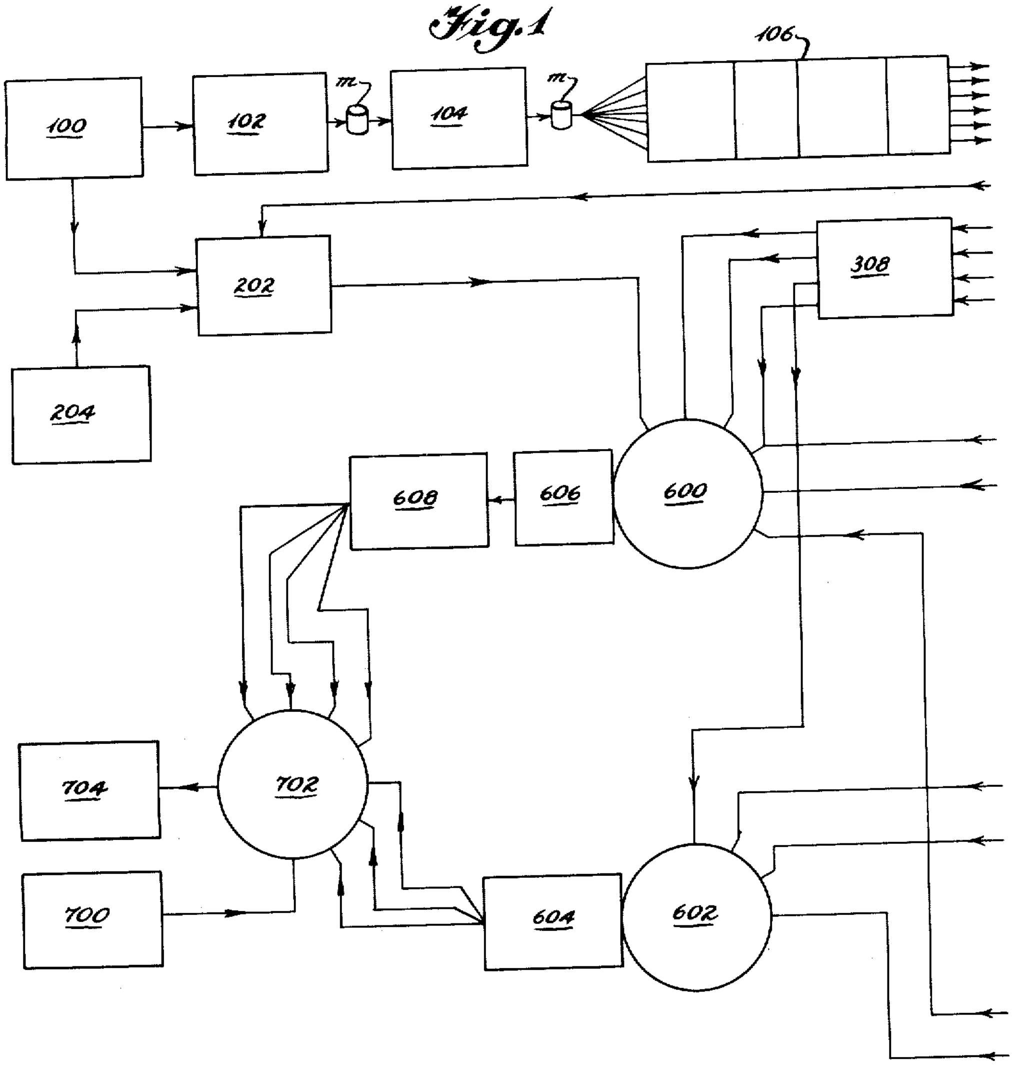

Steatite is a ceramic that possesses satisfactory hardness, strength, heat dissipating ability and electrical insulating qualities to be used for the wafers, and hence steatite wafers are presently produced. This is the first step of the process, and they are made in an expected manner. Raw materials are mixed making a paste that is cut by machine to size and shape. Additional ceramic parts, such as tube sockets are also made at the first station 100 (Fig. 1). The wafer blanks are formed with outwardly opening notches 1, 2, 3, 4, 5, 6, 7, 8, 9, 10, 11 and 12, together with orienting notch 14 between notches 1 and 12. Then they are fired in a furnace and collected for deposit into a machine at station 102.

This machine examines the wafers testing their dimensions and any camber which they may have. All wafers that fail to meet with specified size and camber are rejected by the machine, while the others are accumulated in magazines *m*, the orienting notch 14 of each wafer being used to guide it in a predetermined travel in the magazine so that all wafers are stacked in a definite orderly arrangement. The magazines are movable, it being the present intention to carry them manually from station 102 to station 104 where the notches in the edges of the wafers receive a coating of electrically conductive material. This coating is applied as a liquid containing glass and metal (as silver) particles in a vehicle. The wafers are withdrawn from a magazine *m*, held, and the notches painted. Thereafter the wafers are heated to drive off the vehicle from the paint, thereby drying the same. Wafers are then accumulated in magazines *m* with the orienting notches facing one direction, thereby retaining the same stacked arrangement as between stations 102 and 104. In this way at any station along the production line, an excess of wafers may be stored easily by placing the magazine on a shelf.

Figure 2:
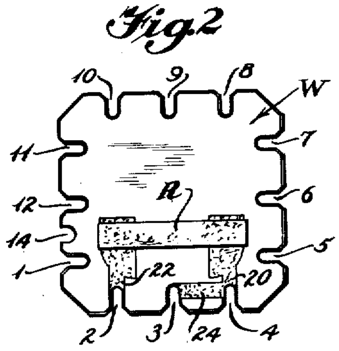
Fig. 2 is a plan view of a ceramic wafer that is used as a part of the module.

At station 106, the wafers begin to assume some individuality. A module includes a plurality of wafers, usually five, but not necessarily so. Although in some instances one or more of the wafers may be left idle, in the majority of instances the wafers will contain electrical components, examples being resistors R or capacitors C. Thus, each wafer must have its small circuit pattern, the wafer W having a simple arrangement of resistor R connected at its ends with notches 2, 3, and 4; contacts 20 and 22 and jumper 24 used for this purpose. Other wafers, or the opposite side of wafer W may contain different components and will probably require the contacts and jumpers if any are necessary, to be in a different location on the wafers. Contacts are applied to the wafer surfaces at station 106, and each consists of an application of paint identical to that used to coat the notches. An entire magazine is used exclusively as a reservoir of wafers to apply one pattern of contacts and jumpers when required, on one wafer surface. For example to apply contacts 20, 22 and jumper 24 on a wafer blank, one line at station 106 will have a single magazine *m* from which wafer blanks are withdrawn, retained in a predetermined position and painted. The "silk screen" method of paint application may be used. Then the wafers coated with the contacts that are placed as shown in Fig. 2 are conveyed to a heat dryer that drives off the liquid from the paint, leaving the solids of the paint adhering to the wafer surfaces. Since six wafers for each module will provide twelve usable surfaces to contain components, and each surface may contain several components, no module need have any more wafers. In fact five wafers per module has proven to be ample for practical use. As noted in Fig. 1, there are six lines from station 104 to 106, each line representing a channel for wafers. One line or channel has been described as being used to apply contacts 20, 22 and jumper 24. The other lines have their own magazines and are used to print other (or the same) patterns of contacts and/or jumpers on other wafers, the selection being dependent upon the character of the produced module that is desired. One or more of the contact printing channels may be operative simultaneously at station 106, depending on the needs of a particular job.

The drying is accomplished at station 106 by a heater through which the wafers are conveyed, and during the conveying, they are turned 180° so that the unpainted surface is upward. At all times the wafers are maintained in a definite orientation by notch 14. Now, the wafers of each line are ready to have contacts and/or jumpers applied to the opposite surfaces thereof by the previously described procedure, after which the metalized coatings are dried. Each of the six lines of wafers are maintained separate as the wafers thereof are conveyed to station 108 where the circuit patterns thereon are tested. Any faulty wafers are rejected and the remainder are conveyed to station 110.

At the last-mentioned station the six lines of wafers are conveyed at proper speed through a furnace wherein all metalized surface portions are adhered to the wafers due to the presence of the glass particles in the paint that forms the contacts and the jumpers. For steatite wafers, they require about an hour in the furnace with a peak temperature of approximately 1350° F. maintained about ten minutes. Even though firing at present requires about an hour, production is fast because the furnace is capable of enclosing a vast number of wafers at once, the wafers each being less than a square inch in planform and about a sixteenth of an inch thick.

The wafers are conveyed through the furnace at station 110 into station 112 where there is an accumulator for each of the six channels that collects the wafers thereof and stores them in a magazine for further treatment in the process. This is the end of the procedure that is followed which is common to all wafers.

*Part 2*

In part one the wafers are made, tested, contacts and jumpers applied, fired and the wafers at the conclusion, inserted in magazines, each magazine containing exclusively, wafers with a definite pattern on each. In this part and those that follow, some steps are common to the wafers in the various magazines, but the common steps are not such as would be performed in connection with all wafers at all times.

One of the magazines has tube socket supporting wafers in it (see application Serial No. 318,148) and the wafers destined for this purpose are moved into station 200 by placement of the magazine so as to have the wafers extracted therefrom, and dip tinned. Hence, all of the metalized portions of the inherently insulating ceramic wafers can be soldered.

Since it is convenient to separate an electronic device into modules in such a way that one tube is included in the module and all of its circuit components, the majority of the modules for a given electronic device, say a sonabuoy, will require a tube socket. Therefore, at station 202 tube socket bases produced at station 100, as an operation separate from the production of wafers, are received and held for assembly. At station 204 tube socket connectors are produced and tinned. The connectors are transported from station 204 to station 202 where they are fixed to the tube socket bases by pressing them into bores in the socket bases. Also, the tube socket bases with their connectors are riveted to one surface of wafers that have been received from station 200. At station 202 the wafers, each containing a socket, are accumulated for final assembly as an element of a module.

*Part 3*

A magazine taken from the end of a channel at station 112 contains wafers with contact patterns on them so located as to receive resistors fitted properly in the module circuit. Accordingly, at station 300 the production of resistors is effected. For space saving purposes and for facility of machine handling, the resistors are produced in tape form, one surface of which is pressure sensitive to adhere to the contacts on the wafers. Rolls of resistor taper are taken from station 300 to station 302 where the proper lengths of taper are cut therefrom by a cutter and applied across the contacts on one surface of a wafer held at station 302. The adhesive on the tape holds it in place temporarily, and if the wafers require resistors on the opposite surface thereof, they are turned and the necessary resistors applied across the contacts. The wafers are then progressed to a press which firmly applies the resistors to the wafers and the wafers are then ready to be transported to station 304 at which location they are conveyed through an oven that cures the resistor tapes and bakes them on the wafer surfaces.

A channel from station 304 leads the wafers to station 306 where an electronic test machine accepts the wafers and tests the resistors for proper ohmic values. Tested wafers progress to station 308 and a wafer accumulator that inserts the wafers into a magazine in readiment for final assembly into a module.

A single module may require two wafers containing only resistors, but the patterns on them different. To cope with this situation separate chanels from station 302 to the curing oven of station 304 are maintained. Moreover, the separate channels are continued into the tester at station 306, and when the tested wafers are accumulated at station 308, the wafers containing the different resistor patterns are stored in separate magazines. These magazines are ultimately delivered to the final module assembling station.

*Part 4*

The capacitor used in modules is made as a step in the general process, however, first the wafers from one of the channels out of station 112 are moved in their magazine to station 400, at which they are dip tinned. The dip tinning is accomplished in the same way that dip tinning took place at station 200 and in fact, the machine for dip tinning at sations 200 and 400 may be the same. The wafers are subjected to the tinning material for the purpose of making the metalized parts of the wafers, that is the notches, contacts and jumpers capable of being soldered to easily.

At station 100, the capacitor disks are made, preferably of a titanete. They are taken to station 402 where each side of each disk has a round pattern of metalized paint applied while the disks are momentarily held. Then the printed disks are conveyed through a heated chamber to dry the liquid coatings of the disks. Thereafter, the disks are conveyed through a furnace at station 404 maintaining operating conditions generally similar to those in the furnace at station 110.

Figure 5:
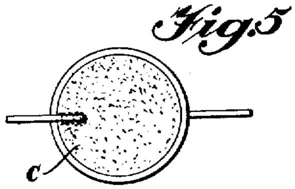
Fig. 5 is a plan view of a capacitor used in the system.
Figure 1A:
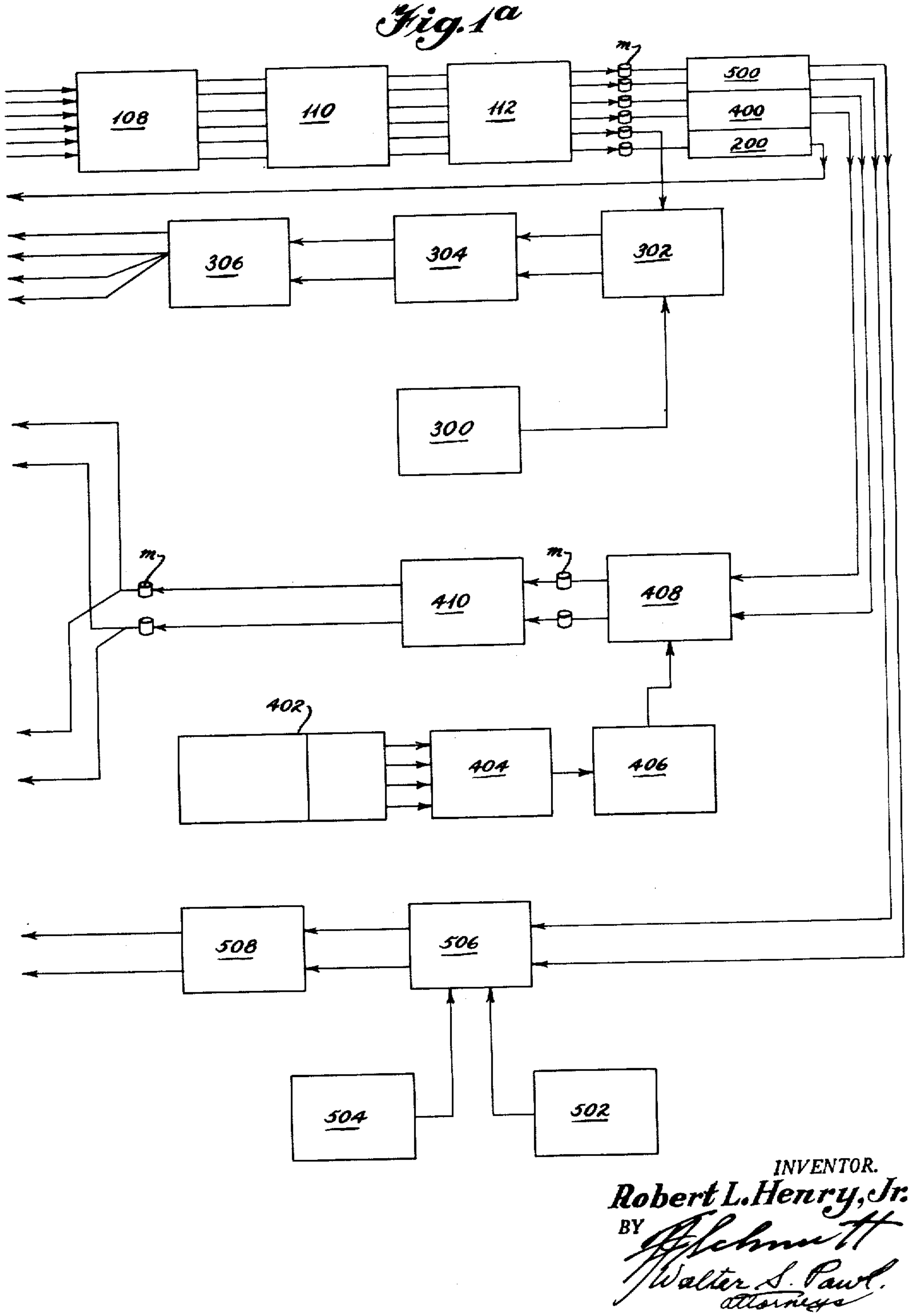

As shown in Fig. 5, the typical capacitor C is provided with metal contacts that must be soldered, and the capacitor must be fixed in some way to a wafer prior to assembly into a module. Therefore, the capacitor disks are moved from station 404 to station 406 where there is a dip tinning apparatus for tinning the metalized surfaces of the capacitor disks.

A wafer containing magazine from station 400 is carried to station 408 and capacitor disks from station 406 are brought to station 408. At the latter station, the capacitors are assembled on the wafers by placing a conductive tab on a conveyor, then stacking a disk on it and a wafer on the disk. Where two or more capacitors are required they are placed in order, and the wafers with their capacitors are induction heated to solder the capacitors on the wafers. In instances where capacitors are required on both surfaces of the wafers, they are simply stacked on the conveyed assembly prior to soldering. Then the conductive tabs are pressed against the wafer contacts, as 20 or 22, and soldered thereto. In all cases, however, the capacitor bearing wafers are not commingled. Those with a single pattern on them are arranged in one magazine while other magazines are used for wafers with different capacitor arrangements. The magazines are then taken to station 410 where they are withdrawn, tested and returned into magazines for easy, orderly transportation to the final module assembly point.

The system is flexible enough that if the particular module being made requires a large number of capacitor wafers, station 408 can handle more than one magazine at a time from the dip tin station 400, or spare magazines of wafers having proper contact patterns can be taken from stock.

*Part 5*

This section deals with special components and parts. In the majority of electronic equipment, resistors and capacitors comprise at least eighty-five percent of the components. Therefore the procedure under parts one through four will change very little or not at all to make modules for any equipment. However, assume that an inductor is required, it can be hand wound or machine wound by existing, known machines at station 502. The same holds true for other components such as unusual capacitors that would be made at station 504 or potentiometers, or crystals. When the special components are produced at stations 502 and/or 504, they are transferred to station 506 which receives one or more magazines of tinned wafers from station 500, that contains a dip tinning machine capable of tinning the metalized portions of the wafers that go into station 500. At station 506, the special components may be hand soldered to the tinned wafers or, the wafers may be conveyed while the special components are placed thereon by machine and soldered by soldering iron techniques practiced by machine.

Thereafter, these wafers are taken to an electronic tester at station 508, preparatory to final assembly. The test apparatus, as the other wafer testing machines for the electrical circuit patterns on the wafers, is a high speed device where wafers are fed into the machine, held properly oriented by notch 14 and tested by the use of test gage apparatus. The defective wafers are automatically rejected, while the others are collected for deposit in one of two module assemblers.

*Part 6*

When a special module, that is one that contains a component other than a resistor or capacitor, is to be assembled, the wafers are routed to the special module assembler at station 602. From station 508, wafers containing the special components are fed to the assembler. One or more capacitor bearing wafer magazines are brought from station 410, and one or more magazines are taken from station 308 to be fed into the assembler at 602.

Figure 3:
Fig. 3 is a typical riser in elevation.
Figure 4:
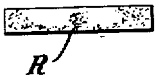
Fig. 4 illustrates a resistor used in the system.

The assembler at station 602 consists of a semi-machine arrangement, some operations being performed by hand. The wafers containing the components are placed in a jig with the orienting notches 14 being alinged, and risers (Fig. 3) are placed in the aligned notches 1 through 12. The risers are conductive wire, whereby they form a part of the circuit of the module when they are soldered in place. Soldering is done by machine, that is soldering irons with enough tips or heating surface to take care of all of the junctions of six risers with the notch coatings of two edges of each wafer, are used to solder all connections on two opposite sides of the module. It is then turned 90° about its longitudinal axis and six more risers applied, this procedure being followed for each module. The ends of the risers are clipped to make them a uniform length, and where the desired module circuit requires intermediate parts of selected risers are cut. Then the entire module is tested at station 604.

The module assembler at station 600 consists of a machine capable of applying the risers in the wafer notches. As stated, the majority of modules will have as components, resistors and/or capacitors, and therefore, the machine is designed to handle such wafers at high speeds. The assembler is fed by magazines from station 202, one or more magazines from station 308, and one or more from station 410. Those wafers having special components that can be fed into magazines, can be taken from station 508 and magazine fed into the assembler at station 600, although the latter alternative will be the exception rather than the rule.

Figure 6:
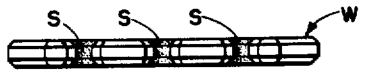
Fig. 6 is an edge view of a ceramic wafer.

Explicitly, the assembler selects one wafer from each magazine and channels all of them to a jig holding the wafers in parallel planes and spaced properly from each other. Measured amounts of solder, shown in Fig. 6 by S, and flux are applied to each wafer notch and an automatic feed mechanism places risers in the aligned notches on two sides of the group of wafers simultaneously. A soldering head for each side of the group of wafers having a small tip for each notch-riser junction moves toward the risers with the tips touching the risers only at the notches. When the risers are heated beyond the melting point of the solder, the soldering heads are withdrawn from the group of wafers.

Then the partially completed module is revolved ninety degrees about its longitudinal axis and the riser placement and soldering duplicated for the other two sides of the module. It is then conveyed to station 606 where an electronic circuit tester assures that the module is electrically sound, after which the riser ends are clipped to uniform length by a wire shearing machine. Where required in the module circuit, one or more risers are clipped between any two wafers.

Now, the R–C modules and special modules, or either, are ready for use or ready to be assembled on a base plate located below in the usual case, above, or both below and above the modules.

Figure 8:
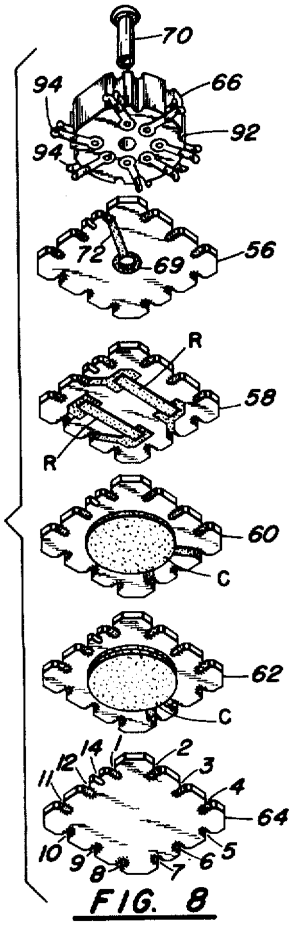
Fig. 8 is an exploded bottom view of the parts of a module shown in Fig. 7.
Figure 7:
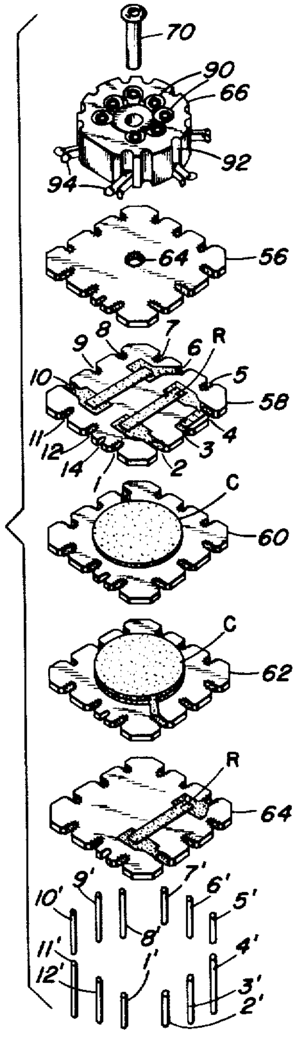
Fig. 7 is an exploded top view of the elements of a module before they are interconnected with risers.
Figure 9:
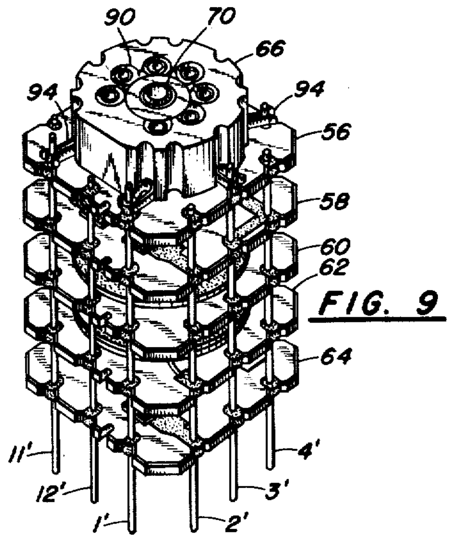
Fig. 9 is a completed module of the parts shown in Figs. 7 and 8.

Reference is now made to Figs. 7, 8 and 9, the former two of which show exploded top and bottom views, respectively, of a module immediately before completion and the latter of which shows a completed module. In Figs. 7 and 8, a number of wafers 56, 58, 60, 62 and 64 are shown. Each one is provided with at least one electronic component connected to the coating of one or more notches, and each wafer with its component or components is adapted to be assembled in a module, for example, the module shown in Fig. 9. Wafer 56 is used as a support for tube socket 66 and is provided with a central aperture, the periphery of which has a coating 69 of electrically conductive material identical to that used to cover the notch surfaces of wafer W of Fig. 6. The purpose of this aperture is to seat the electrostatic shield 70 which is located in an opening at the center of tube socket 66. There is a contact 72 connecting coating 69 and one of the laterally opening notches of wafer 56. Wafer 58 has two resistors on its top surface and two resistors on its bottom surface, together with suitably located contacts to connect them for electrical conduction with coatings of certain of the notches. Wafer 60 has a capacitor on the top surface and a capacitor on the bottom surface, and these capacitors are of disc formation and bonded to wafer 60 and are provided with contacts for connecting the capacitor leads to predetermined notches of the wafer. Wafer 62 shows use of a different type of capacitor, the multiple disc type, to obtain a higher value capacitor, and wafer 64 illustrates the use of only one surface of the wafter to support a resistor.

The base of tube socket 66 may be made of steatite, or another ceramic, or any other suitable material. It has passages containing metal grommets 90 into which the tube prongs are to be separately connected, and the central bore necessary for accommodation of shield 70. A series of laterally opening grooves 92 are formed in the socket base, some (for the module of Fig. 9) of which contain the root ends of the furcations of clips 94. The shank of each clip 94 is secured to the lower end of one of the metal grommets whereby electrical conductivity may be established from and to the prongs of a tube in the socket 66.

As previously mentioned, after manufacture of the component parts of a module, they are assembled in a stack and held in place by wire risers 1′, 2′, 3′, 4′, 5′, 6′, 7′, 8′, 9′, 10′, 11′ and 12′. The selected wafers are placed so that the orienting notch of each is superposed, thereby assuring proper circuit arrangement. This holds true for the socket 66 because it is fixed to wafer 56 containing an orienting notch 14. The riser 1′ is placed in all of the vertically aligned notches 1 of the wafers, and rieser 2′ is placed in all of the vertically aligned notches 2 of the wafers. The placement of risers in vertically aligned notches is continued until all of the notches contain a riser, and then they are soldered in place. Thus, the completed module shown in Fig. 9, after testing is ready for use as a complete electronic device or as a sub-assembly with other modules or other circuits depending upon what is contained on the various wafers and how they are connected.

*Part 7*

The base plates are made of metal, copper being suggested, clad plastic. For producing the base plate at station 700, a circuit pattern to connect and unify the circuits of the modules to be connected thereto, is determined. Then by a conventional photo printing method the desired circuit is formed in metal part of the base plate. Thereafter, the base plates are transferred to station 702 at which place the module riser ends are plugged in tapered openings provided in the base plate, soldered to the base plate in proper circuit arrangement, or both. The next step is to test the assembly with test apparatus at station 704 to determine whether the assembly is sound. If so, it may be used as the electronic portion of a device or as a part thereof depending on the make-up of the modules and plate circuit.

The entire process can be practiced by hand, if desired, or a variety of machines can be used for the equipment at each stage. For example, the furnace at station 104 may be an oven with a conveyor in it moving slowly therethrough. On the other hand, the wafers after receiving their coating in the notches may be placed on an encased spiral that is located in a heated zone, and the wafers moved along the spiral to a point of discharge. Numerous other variations may be resorted to, as will become apparent to those skilled in the art.

What is claimed is:

1. The method of producing a modular electrical unit that has a circuit pattern on a number of wafers held in stacked relation by electrically conductive risers, including the steps of producing the wafers of uniform size and forming edge notches therein, metalizing the notches, applying in predetermined patterns on the wafers conductive coatings that contact to at least some of the notches, tinning the notches and coatings, applying electrical components to the tinned coatings, assembling the wafers in stacks while holding a clearance between each wafer of each stack, and thermomechanically fixing the risers in the notches to the wafers to retain the stacks of wafers in single unit form.

2. The method of claim 1 and the step of fixing a tube socket to one of the wafers prior to fixing the risers in the notches.

3. The method of producing a modular electrical unit that has a circuit pattern on a number of wafers held in stacked relation by electrically conductive risers, including the steps of producing the wafers of uniform size and forming edge notches therein, metalizing the notches by painting and heating the wafers to dry the paint in the notches, accumulating the wafers in an orderly arrangement, moving from the orderly arrangement of wafers several channels of wafers, applying conductive coatings of various shapes and in various positions on the wafer surfaces of each of said several channels of wafers so that the conductive coatings are in electrical contact with certain of said metalized notches, drying the coatings on the wafers and firing the wafers, again accumulating the wafers in an orderly arrangement, directing from the accumulation of wafers flows of at least two independent lines of wafers, applying electrical components to the coatings on the wafers of one of said independent lines, applying another element to the wafers of the other of said two independent lines, assembling one wafer from one line with one wafer of the other line in spaced relation but in parallel planes, and thermo-mechanically fixing the risers in the metalized notches and to the wafers.

4. The method of producing a modular electrical unit that has a circuit pattern on a number of wafers held in stacked relation by electrically conductive risers, including the steps of producing the wafers of uniform size and forming edge notches therein, metalizing the notches by painting and heating the wafers to dry the paint in the notches, accumulating the wafers in an orderly arrangement, moving from the orderly arrangement of wafers several channels of wafers, applying conductive coatings of various shapes and in various positions on the wafer surfaces of each of said several channels of wafer so that the conductive coatings are in electrical contact with certain of said metalized notches, drying the coatings on the wafers and firing the wafers, again accumulating the wafers in an orderly arrangement, directing from the accumulation of wafers flows of at least two independent lines of wafers, applying electrical components to the coatings on the wafers of one of said independent lines, applying another element to the wafers of the other of said two independent lines, assembling one wafer from one line with one wafer of the other line in spaced relation but in parallel planes, electrically connecting the risers in the metalized notches and to the wafers, severing the risers to uniform length, testing the units thus produced, and then assembling the units on a base.

5. The method of producing a modular electrical unit that has a circuit pattern on a number of wafers held in stacked relation by electrically conductive risers, including the steps of producing the wafers of uniform size and forming edge notches therein, metalizing the notches by painting and heating the wafers to dry the paint in the notches, accumulating the wafers in an orderly arrangement, moving from the orderly arrangement of wafers several channels of wafers, applying conductive coatings of various shapes and in various positions on the wafer surfaces of each of said several channels of wafers so that said conductive coatings are in electrical contact with certain of said metalized notches, drying the coatings on the wafers and firing the wafers, again accumulating the wafers in an orderly arrangement, directing from the accumulation of wafers flows of at least two independent lines of wafers, applying electrical components to the coatings on the wafers of one of said independent lines, applying another element to the wafers of the other of said two independent lines, assembling one wafer from one line with one wafer of the other line in spaced relation but in parallel planes, electrically connecting the risers in the metalized notches and to the wafers, testing the unit, producing a base plate having a circuit pattern thereon, and securing the unit to the base plate with the circuit of the unit integrated with the circuit pattern on the base plate.

6. In the method of manufacturing a modular electrical unit that comprises a plurality of parallel spaced electrically insulating wafers held assembled by risers fixed to the periphery of the wafers, the steps of producing the wafers with edge notches from their raw material parts, mechanically examining the wafers and rejecting those that do not meet with a prescribed size and shape standard, assembling the retained wafers, drawing the wafers from the assembly and applying an electrically conductive coating in the notches, accumulating the wafers after the notches have received their coatings, applying liquid contacts of selected patterns on one surface of the wafers so that said liquid contacts are in electrical connection with certain of said coated notches, orienting the wafers approximately one hundred and eighty degrees and applying other liquid contacts of selected patterns on the opposite surfaces of the wafers so that said other liquid contacts are in electrical connection with certain of said coated notches, heating the wafers to dry the liquid contacts on the wafers, testing the wafers for electrical conduction through the contacts and rejecting the faulty wafers, firing the wafers to bond the notch coatings and contacts to the wafer surfaces, accumulating and assembling the wafers, tinning the notch coatings and contacts on the wafers, accumulating the tinned wafers, routing some of the wafers in a first path and routing other wafers in a second path, applying a first electrical component to at least one surface of each wafer in the first path and in engagement with the contacts thereon, thermo-treating the components, applying a different component to the contacts on the wafers in the other path, accumulating the wafers from the first path, separately accumulating the wafers from the second path, extracting some accumulated wafers and holding them spaced apart in parallel planes, locating risers in aligned notches of the held wafers, and thermo-mechanically fixing the risers to the wafers.

7. In the method of manufacturing a modular electrical unit that comprises a plurality of parallel spaced electrically insulating wafers held assembled by risers fixed to the periphery of the wafers, the steps of producing the wafers with edge notches from their raw material parts, mechanically examining the wafers and rejecting those that do not meet with a prescribed size and shape standard, assembling the retained wafers, drawing the wafers from the assembly and applying an electrically conductive coating in the notches, accumulating the wafers after the notches have received their coatings, applying liquid contacts of selected patterns on one surface of the wafers, orienting the wafers approximately one hundred and eighty degrees and applying liquid contacts of selected patterns on the opposite surfaces of the wafers, heating the wafers to dry the liquid contacts on the wafers, testing the wafers for electrical conduction through the contacts and rejecting the faulty wafers, firing the wafers to bond the notch coatings and contacts to the wafer surfaces, accumulating and assembling the wafers, tinning the notch coatings and contacts on the wafers, accumulating the tinned wafers, routing some of the wafers in a first path and routing other wafers in a second path, applying a first electrical component to at least one surface of each wafer in the first path and in engagement wtih the contacts thereon, thermo-treating the components, applying a different component to the contacts on the wafers in the other path, accumulating the wafers from the first path, separately accumulating the wafers from the second path, extracting some accumulated wafers and holding them spaced apart in parallel planes, locating risers in aligned notches of the held wafers, and electrically connecting the risers to the wafers, removing portions of the risers to make them a predetermined length, and testing the electrical circuit pattern on the wafers through the risers.

8. The method of claim 6 and the steps of making a base with a circuit pattern thereon, and electrically connecting ends of the risers to the base to thereby connect the circuit on the wafers and risers with the circuit pattern on the base.

9. In the method of manufacturing a modular electrical unit that comprises a plurality of parallel spaced electrically insulating wafers held assembled by risers fixed to the periphery of the wafers, the steps of producing the wafers with edge notches from their raw material parts, mechanically examining the wafers and rejecting those that do not meet with a prescribed size and shape standard, assembling the retained wafers, drawing the wafers from the assembly and applying an electrically conductive coating in the notches, accumulating the wafers after the notches have received their coatings, applying liquid contacts of selected patterns on one surface of the wafers so that said liquid contacts are in electrical connection with certain of said coated notches, orienting the wafers approximately one hundred and eighty degrees and applying other liquid contacts of selected patterns on the opposite surfaces of the wafers so that said other liquid contacts are in electrical connection with certain of said coated notches, heating the wafers to dry the liquid contacts on the wafers, testing the wafers for electrical conduction through the contacts and rejecting the faulty wafers, firing the wafers to bond the notch coatings and contacts to the wafer surfaces, accumulating the wafers, tinning the notch coatings and contacts on the wafers, accumulating the tinned wafers, routing some of the accumulated wafers in a first path and routing others of the accumulated wafers in a second path, applying a first electrical component to at least one surface of each wafer in the first path and in engagement with the contacts thereon, thermo-treating the components, making a plurality of different components, tinning said different components, applying them to the surfaces and touching the contacts of the wafers in said second path, accumulating the wafers with said different components thereon, extracting some wafers with said first component thereon from the first path and some wafers with said different component thereon, holding them in parallel spaced planes, and thermo-mechanically joining the risers in the aligned notches of the parallel wafers thereby placing the risers in circuit with the components on said wafers.

10. In the method of manufacturing a modular electrical unit that comprises a plurality of parallel spaced electrically insulating wafers held assembled by risers fixed to the periphery of the wafers, the steps of producing the wafers with edge notches from their raw material parts, mechanically examining the wafers and rejecting those that do not meet with a prescribed size and shape standard, assembling the retained wafers, drawing the wafers from the assembly and applying an electrically conductive coating in the notches, accumulating the wafers after the notches have received their coatings, applying liquid contacts of selected patterns on one surface of the wafers so that said liquid contacts are in electrical connection with certain of said electrically conductive coated notches, orienting the wafers approximately one hundred and eighty degrees and applying other liquid contacts of selected patterns on the opposite surfaces of the wafers so that said other liquid contacts are in electrical connection with certain of said electrically conductive coated notches, heating the wafers to dry the liquid contacts on the wafers, testing the wafers for electrical conduction through the contacts and rejecting the faulty wafers, firing the wafers to bond the notch coatings and contacts to the wafer surfaces, accumulating the wafers, tinning the notch coatings and contacts on the wafers, accumulating the tinned wafers, routing some of the wafers in a first path and routing other wafers in a second path, applying a first electrical component to at least one surface of each wafer in the first path and in engagement with the contacts thereon, thermo-treating the components, making a plurality of different components, tinning said different components, applying them to the surfaces and touching the contacts of the wafers in said second path, accumulating the wafers with said different components thereon, extracting some wafers with said first component thereon from the first path and some wafers with said different component thereon, holding them in parallel spaced planes, and electrically connecting the risers in the aligned notches of the parallel wafers thereby placing the risers in circuit with the components on said wafers, severing the ends of the risers to a uniform length, testing the circuit on the wafers, and assembling the riser ends on a base.

11. The method of making electronic modules comprising the steps of producing ceramic wafers and forming edge notches therein, applying a conductive coating to the walls of the notches, bonding intimately to the surfaces of the wafers contacts that are joined to the coatings in some of the notches, tinning the conductive coating in the notches and the contacts, accumulating the wafers into groups distinguished by the contact pattern thereon, withdrawing wafers from a first group and applying a first component across the contacts on the wafers, withdrawing the wafers from a second group and applying a second component on the contacts of the wafers, accumulating the wafers with the first components thereon and separately accumulating the wafers with the second components thereon, extracting wafers from each of the last mentioned two groups and arranging them in parallel spaced planes and in alignment, placing electrically conductive risers in the aligned notches of the aligned wafers, and soldering the risers in the notches thereby mechanically fixing the wafers in assembly as a unit, and electrically connecting the components of the wafers in circuit.

12. The method of claim 11 wherein the step of soldering the risers in the notches includes first the step of applying a quantity of metal flux and solder in each notch and applying heat to the risers only at the region of the junction of the risers with the notch coatings.

13. The method of making modular electronic units from ceramic wafers having edge notches and a plurality of conductive risers comprising the steps of metalizing the wafer notches, printing circuit patterns on the wafers and in contact with some of the metalized notches, fixing electronic components to the wafer surfaces and in engagement with said patterns, holding the wafers spaced apart and in parallel planes, applying the risers in aligned wafer notches, and thermo-mechanically fixing the risers to the wafers to maintain the wafers spaced apart.

14. The method of claim 13 wherein one of the components is a tube socket made by pressing tube prong sleeves into a socket base, and riveting the base to one of said wafers that is held spaced apart and in parallel planes.

15. In the method of manufacturing an electronic module that includes a plurality of wafers with peripheral notches, a plurality of risers, and electronic components, the steps of metalizing the notches, metalizing partial circuits including some of the notches on the wafers, fixing components in said partial circuits thereby making them more complete, disposing a plurality of wafers in a number of parallel planes and in superposition, thermo-mechanically fixing one half of the total number of risers in notches which are positioned on opposite sides of each of said wafers and in said partial circuit, rotating said wafers through an angle of 90 degrees; and thermo-mechanically fixing the remainder of the risers in the remainder of the notches and in said partial circuit.

16. A method of making a module from a plurality of wafers comprising the steps of: forming edge notches about the periphery of said wafers, metalizing said notches, printing conductive paths on some of said wafers in contact with selected metalized notches, fixing electrical devices to at least some of said wafers in electrical connection with said paths, disposing said wafers in spaced parallel planes, seating a plurality of conductive risers in said notches normal to the planes, and electrically connecting said risers into said notches.

17. The method of making a module from an assemblage of wafers comprising the steps of: forming edge notches about the periphery of said wafers, metalizing said notches, printing conductive paths on some of said wafers so that they are in electrical connection with selected notches, fixing electrical devices to at least some of said wafers in electrical connection with said paths, disposing said wafers in spaced parallel planes with the notches in registry, seating a conductive riser in each respective series of notches, electrically connecting a first group of risers into their respective notches, and thermomechanically securing the remaining risers into their respective notches.

References Cited in the file of this patent

UNITED STATES PATENTS 2,474,988 Sargrove ---------------- July 5, 1949

2,493,199 Dhouri ---------------- Jan. 3, 1950
2,502,291 Taylor ---------------- Mar. 28, 1950
2,616,994 Luhn ---------------- Nov. 4, 1952

FOREIGN PATENTS 635,756 Great Britain ---------- Apr. 19, 1950

OTHER REFERENCES

New Advances in Printed Circuits, N. B. S. Miscellaneous Publication 192, Nov. 22, 1948.

U. S. DEPARTMENT OF COMMERCE

PATENT OFFICE

CERTIFICATE OF CORRECTION

Patent No. 2,771,663 November 27, 1956

Robert L. Henry, Jr.

It is hereby certified that error appears in the printed specification of the above numbered patent requiring correction and that the said Letters Patent should read as corrected below.

Column 5, lines 12 and 13, for "taper", each occurrence, read --tape--; column 13, lines 5 and 6, for "thermomechanically securing" read --electrically connecting--.

Signed and sealed this 1st day of April 1958.

(SEAL)

Attest:

KARL H. AXLINE

Attesting Officer

ROBERT C. WATSON

Commissioner of Patents